E. T. WOLF.
REMOVABLE MOLD FOR MAKING PIANO HAMMERS.
APPLICATION FILED JAN. 27, 1905.
969,827.
Patented Sept. 13, 1910.
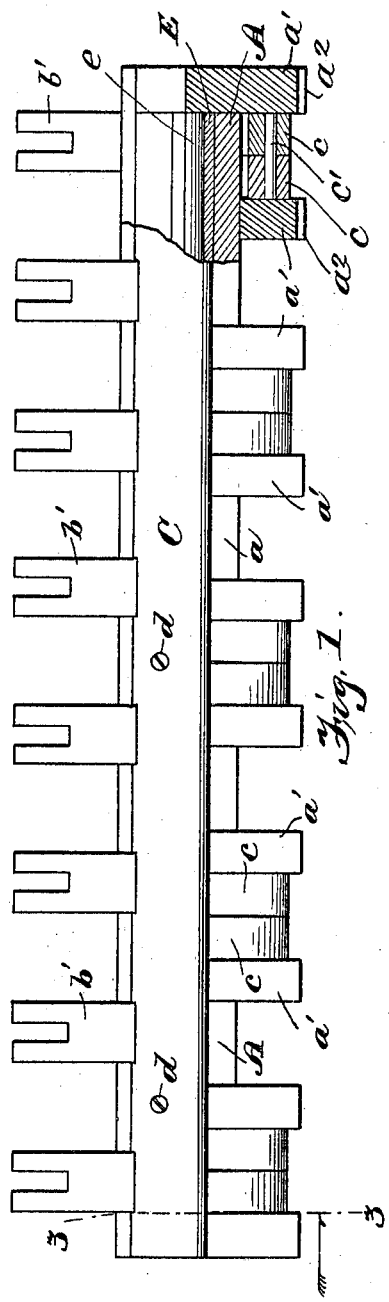
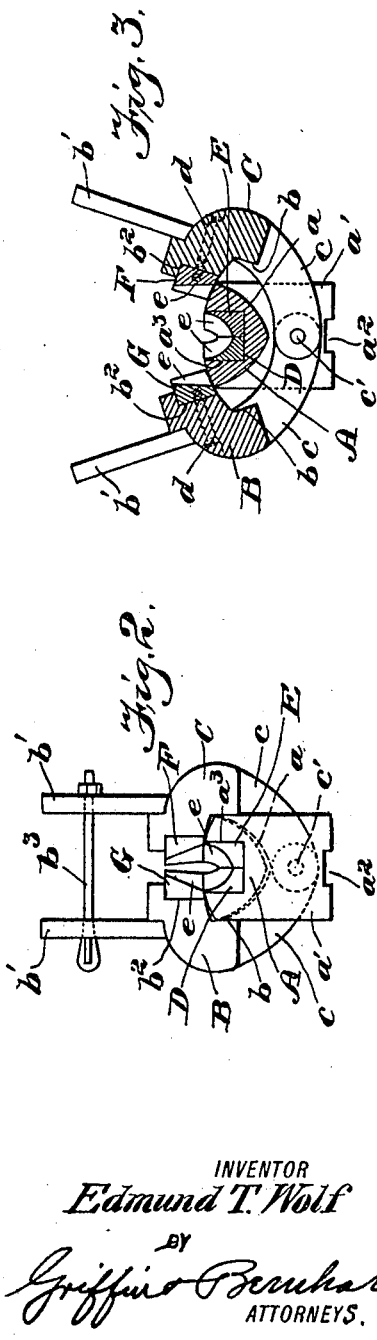
WITNESSES:
Robert Head
V. E. Nichols.
INVENTOR
Edmund T. Wolf
BY
Griffin & Bernhard
ATTORNEYS.

UNITED STATES PATENT OFFICE.

EDMUND T. WOLF, OF NEW YORK, N. Y., ASSIGNOR TO FRANK L. ZABRISKIE, OF NEW YORK, N. Y.

REMOVABLE MOLD FOR MAKING PIANO-HAMMERS.

969,827.  Specification of Letters Patent.  Patented Sept. 13, 1910.

Application filed January 27, 1905. Serial No. 242,955.

*To all whom it may concern:*

Be it known that I, EDMUND T. WOLF, a citizen of the United States, residing in the city of New York, borough of the Bronx, in the county and State of New York, have invented certain new and useful Improvements in Removable Molds for Making Piano-Hammers, of which the following is a specification.

My invention relates to a removable mold for making piano-hammers, the same being designed for use in connection with any suitable kind of power machine which will exert the required pressure on one or more layers of felt, for the purpose of compressing said felt around the hammer-molding.

In the manufacture of piano-hammers it is customary to make a complete set of hammers at one operation. It is usual to employ a fixed mold or die which forms a permanent fixture in the machine, in which permanent die one or more long strips or layers of felt are adapted to be placed when the mold is spread open, after which the moldings of the set are pressed upon the felt, and the die is closed in order to compress the felt around the moldings. The die remains closed for a period of five or six hours to allow the adhesive, usually glue, to harden in order to bind the moldings and felt into one solid mass, after which the mold is opened, the work removed, and it is cut transversely to produce the individual hammers. Difficulty has heretofore been experienced in removable molds for this class of work, in securing molds which will stand the pressure that is necessarily applied to the mold for compressing the felt around the hammers. Owing to the length of a removable mold necessary to make a set of hammers at one operation, it is found that the mold-sections will bend out of shape or alinement.

One object of my present invention is to provide an improved construction of removable mold, wherein the moving parts are so reinforced at numerous points throughout the length thereof as to be free from the tendency to bend or buckle under the pressure exerted on the mold by the power machine.

Another object of the invention is to provide a removable mold with means whereby different sizes and shapes of hammers may be made on the same mold structure by the substitution of one set of working parts for another.

Broadly speaking, my removable mold consists of a base or carriage, movable jaws supported on said base, and mold-sections or cauls fitted to the base and the jaws and adapted in the closed positions of the jaws, to produce a mold cavity corresponding to the shape of a set of hammers. As a preferred construction, I provide each of the movable jaws with a plurality of arms distributed at numerous points throughout the length thereof, said arms of the jaws being hinged together. The base or carriage has a number of legs, between each pair of which is arranged a pair of hinged arms that project downwardly from the jaws. This construction braces the carriage and reinforces the jaws at numerous points, so that a solid substantial backing is furnished for the cauls, the latter constituting the active members or working parts of the mold for shaping the felts of the hammer set.

Another of the practical difficulties in the construction of molds for this special class of work consists in the adaptation of the mold structure to the manufacture of sets of hammers the felt in which may vary in weight from eight (8) to sixteen (16) pounds per set. This of course requires cauls the active surface of which are specially fashioned to suit the different weights of felt. Again, as is well known, the hammers of a set are of different sizes, increasing gradually from the smallest to the largest in the set. It is difficult to accurately shape or fashion these working mold surfaces for all the different sizes of hammer sets, and as a large number of molds are ordinarily required, the item of expense for the molds is a considerable one.

In my present invention the working parts of the mold consist of a plurality of sections of cauls, two of which are carried by the movable jaws and one or more of which are supported by the base or carriage; the working surfaces of said cauls being so shaped as to produce on the closure of the parts, a mold cavity of the desired cross sectional form and the necessary longitudinal taper corresponding to the set of hammers.

References to be had to the accompanying drawings, forming a part of this specification, wherein like characters of reference are used to indicate corresponding parts in all the figures.

Figure 1 is a view in side elevation of my removable mold or die for making a complete set of piano hammers at one operation. Fig. 2 is a view in end elevation showing the mold in a closed condition. Fig. 3 is a cross section on the line 3—3 of Fig. 1, the parts of the old being thrown open to receive the felt and the hammer-molding.

A designates the base or carriage and B, C, the movable jaws of my removable mold or die.

The base or carriage A is cast in a single piece of metal, the same comprising a long strip or length having any desired cross sectional form, although the sides $a$ of the carriage are shown as converging downwardly. This base is provided at a number of points throughout its length with short legs or feet $a'$, made integral with said base, and in the lower edges of the legs are notches $a^2$, said notches being in alinement with each other and producing a longitudinal guideway, whereby the base or carriage is adapted to receive a track or rail (not shown) which is provided in a suitable power machine for holding the mold or die in place therein. This carriage is also provided with a groove or channel $a^3$, the latter being in the upper side of said carriage and extending the full length thereof. This groove may be square or of other desired shape in cross section, and it is preferably uniform in depth and width throughout the length of the carriage.

The jaws B, C, are disposed on the respective sides of the base, each jaw extending the full width of the base. The jaws are of suitable cross sectional form, being provided with grooves $b$ to receive the upper edges of the base A when they are closed over the latter, as shown by Fig. 2. Said jaws have arms $c$ made integral therewith, and these arms are extended below the solid part of the carriage so as to overlap at their otherwise free ends, the arms being preferably curved in order to fit below the base. It will be understood that each jaw has a series of arms, and that the corresponding arms on the jaws have lapping relation, whereby the companion pairs of arms are adapted to be connected pivotally by the bolts $c'$, or their equivalents. The two jaws are hinged together at numerous points below the mold or carriage, and the arms $c$ of each pair occupy the space between an adjacent pair of legs $a'$ on the carriage, as shown by Fig. 1, thus holding the jaws against movement or displacement in an endwise direction on the base, while at the same time the jaws are free to open or close laterally on their hinged connections. The jaws are provided, furthermore, with longitudinal recesses $b^2$ in their opposing faces, see Figs. 2 and 3, and, they have upwardly extending arms $b'$, which are adapted to be fastened together in pairs by bolts $b^3$, the same being effective in holding the parts of the mold in a closed position.

The shaping and compression members of the mold consist of a plurality of sections or cauls, herein shown as four in number, and indicated at D, E, F, G. The cauls D, E, are complements shaped and proportioned to form the lower half of the mold cavity, and they are adapted to fill the groove $a^3$ snugly in the base or carriage A, said parts having abutting engagement with each other and with the walls of the groove $a^3$, whereby they are held in place on said base. It is evident that the cauls may be readily lifted out of the base, or placed in position therein. If desired, the two cauls D E can be made in one piece, although I prefer to make them in separate pieces, as shown. The other cauls, F, G, are complements of each other, to produce the upper half of the mold cavity when the parts of the mold are closed. Said cauls are arranged to occupy the recesses $b^2$ of the respective jaws B, C. These cauls may be attached by any suitable means to the jaws, such as by the bolts $d$, in order that the cauls may be made to approach toward or recede from each other with the jaws B, C, in opening or closing the mold. The members or cauls, D, E, F, H, have working surfaces $e$, which are curved both longitudinally and transversely thereof so as to produce a mold cavity which not only has the proper cross sectional contour to shape the felt around the molding, but which has a relatively slight taper from end to end for the purpose of making the different sizes of hammers comprised in the set.

In operation, the jaws B, C, and the cauls F, G, are opened as in Fig. 3, and one or more layers of felt are placed across the lower half of the mold cavity formed by the cauls D, E, on the base A. A molding for a set of hammers is now pressed upon the felt, and the jaws B, C, with the cauls F, G, are closed in order that the required pressure may be exerted upon the felt to compress it around the molding and at the same time compress or solidify the felt and give it the requisite shape. The bolts $b^3$ are placed in the arms $b'$ for keeping the mold closed securely, and it is then withdrawn or removed from the machine, the mold being set aside for the glue or adhesive to set and harden so as to bind the molding and felt solidly together. The mold may now be unlocked and opened, the work removed, and the work is then cut to produce a complete set of hammers.

From the foregoing description taken in connection with the drawings, it will be understood that my mold is separate from or independent of the machine or press in which the mold is to be used, said mold being removable with the work from the press and being set aside in order that the work in the mold may set or harden. This enables a number of molds to be used in one machine or press, and the latter may remain in operation indefinitely and without regard to the molds which may have been used therein and withdrawn therefrom.

Changes in the form, size, proportion, and minor details of construction may be made without departing from the spirit of the invention or sacrificing any of the advantages thereof, and I, therefore, reserve the right to make such alterations and modifications as fairly fall within the scope of my invention as defined by the annexed claims.

Having thus described my invention, what I claim and desire to secure by Letters Patent is:—

1. A removable mold comprising a base adapted to be inserted into, and withdrawn from, a hammer making press, said base being provided with a part of the mold cavity, and jaws movable into registration with each other and with the base to produce a substantially complete mold cavity, said jaws being hinged to each other below the mold cavity of the base, and said hinged connection of the jaws being disconnected from the base.

2. A removable hammer mold comprising a base, jaws hinged to each other below the base, and cauls supported by the base and the respective jaws.

3. A removable hammer mold comprising a base having means for supporting the same at a number of points, and complemental jaws hinged to each other below the base.

4. A removable hammer making mold comprising a base, jaws coöperating with said base and with each other to produce a mold cavity, and members extending from the respective jaws, the members of one jaw being pivoted to the members of the other jaw, said pivots and the members being disconnected from and independent of attachment to the base.

5. A removable hammer mold comprising a base, and complemental jaws provided with arms pivoted to each other below the base.

6. A removable hammer mold comprising a base having feet, and jaws provided with connected arms which are disposed between the feet and hold the jaws against endwise movement relative to the base.

7. A removable hammer mold comprising a base having feet, and jaws provided with arms extending below the base and between the feet thereof, said arms being pivoted together.

8. A removable hammer mold comprising a base, movable jaws supported thereby and pivoted upon a common pivot below and independent of the base, and complemental cauls removably supported in the base and jaws.

9. A removable hammer mold comprising a base, separable pivoted jaws arranged when closed to overlap the base, cauls supported on the base in a position between the jaws when closed, and other cauls supported on the individual jaws and movable into registering positions with said cauls on the base when said jaws are closed, whereby the movable cauls and the stationary cauls are adapted to register and produce a mold cavity.

10. A removable hammer mold comprising a base, jaws hinged to each other independently of the base and a group of cauls supported by the base and jaws and removable therefrom; said cauls being constructed to produce a mold cavity having the proper cross sectional contour for a set of piano hammers.

11. A removable hammer mold comprising a base, jaws hinged to each other independently of the base, complemental cauls carried by the jaws and adapted to be moved therewith to close positions over the base, and thereby produce a portion of a mold cavity, and another caul or cauls on said base and forming the remainder of the mold cavity.

12. A removable hammer mold comprising a base, jaws hinged to each other independently of the base, and complemental cauls adapted to produce a desired mold cavity, certain of the cauls being on the base and other cauls being movable with said jaws.

13. A removable hammer mold comprising a base having a longitudinal groove, cauls held in said groove and forming a part of a mold cavity, hinged jaws hinged together on a common pivot below and in vertical line with the center of said cavity, and other cauls carried by the jaws and adapted to swing therewith over the base into registration with the first named cauls to complete the mold cavity.

14. A piano-hammer mold comprising a carriage adapted for insertion into and removal from a press, movable jaws connected with said carriage, and removable cauls supported by the carriage and the jaws, respectively, said jaws and the cauls being adapted for insertion and removal with the carriage.

15. A removable hammer-mold comprising a base, a set of cauls on the upper side of said base, coöperating jaws hinged to each other below said base, said hinge-connection being independent of the base, and other cauls carried by the jaws and movable into registration with each other and with the cauls of the base when said jaws are swung inward.

16. A removable hammer mold comprising a base, a set of cauls supported removably on said base, coöperating jaws connected to each other, said jaws being movable outwardly free from the base, and also movable inwardly into overlapping relation to said base, and other cauls removably connected to said jaws and movable therewith into registration with each other and with the cauls of said base.

17. A piano hammer mold comprising a carriage having a mold cavity, jaws hinged together on a common pivot below, and in a vertical line with the center of, said cavity, and a plurality of cauls fitted to the carriage and the jaws.

18. A piano hammer mold comprising a carriage having a mold cavity, jaws hinged together on a common pivot below, and in a vertical line with the center of, said cavity, and a plurality of cauls fitted to the carriage and the jaws, said cauls being removable individually from the carriage and the jaws, respectively.

19. A piano hammer mold comprising a carriage, a plurality of cauls fitted to said carriage and producing thereon the lower part of a mold cavity, jaws hinged below the center of said mold carriage, and other cauls movable with the jaws into registration with each other and with said jaws on the carriage.

20. A removable hammer mold comprising a base, hinged jaws arranged to close over the base, and a group of separable cauls supported by the base and the jaws, said cauls being brought into registration to produce a mold cavity by the closure of the jaws.

21. A removable mold comprising a base adapted for insertion into, and withdrawal from, a hammer making press, and coöperating jaws supported on said base for movement therewith, said jaws being hinged directly to each other and said hinged connection being disconnected from the base.

22. A removable mold comprising a base, and coöperating jaws supported by said base for movement therewith, said jaws being hinged to each other and said hinged connection being independent of the base.

23. A removable mold comprising a base, the upper surface of which forms a part of the mold cavity, and coöperating jaws hinged directly together, such hinged connection being below said part of the mold cavity on the base, and said connection being disconnected from the base.

24. A piano-hammer making mold comprising a base adapted to be inserted into, and removed from, a hammer making press, said base having a recess, jaws supported wholly by the base and movable relatively to the recess therein, cauls positioned in the recess of the base and forming a part of the mold cavity, and other cauls carried by the jaws and adapted to register with the cauls of the base to complete the mold cavity, each of said cauls being removable, and said jaws and cauls being carried wholly upon the base so as to be insertible and removable with said base.

25. A piano-hammer making mold comprising a base adapted to be inserted into, or removed from, a hammer-making press, jaws hinged to each other, and a plurality of cauls fitted removably to the respective jaws and the base, two of said cauls being movable with the jaws relative to the cauls of the base and said cauls, when assembled into registration, being adapted to produce a substantially complete mold cavity.

In testimony whereof I have signed my name to this specification in the presence of two subscribing witnesses.

EDMUND T. WOLF.

Witnesses:
JAS. H. GRIFFIN,
H. I. BERNHARD.